Patented July 6, 1937

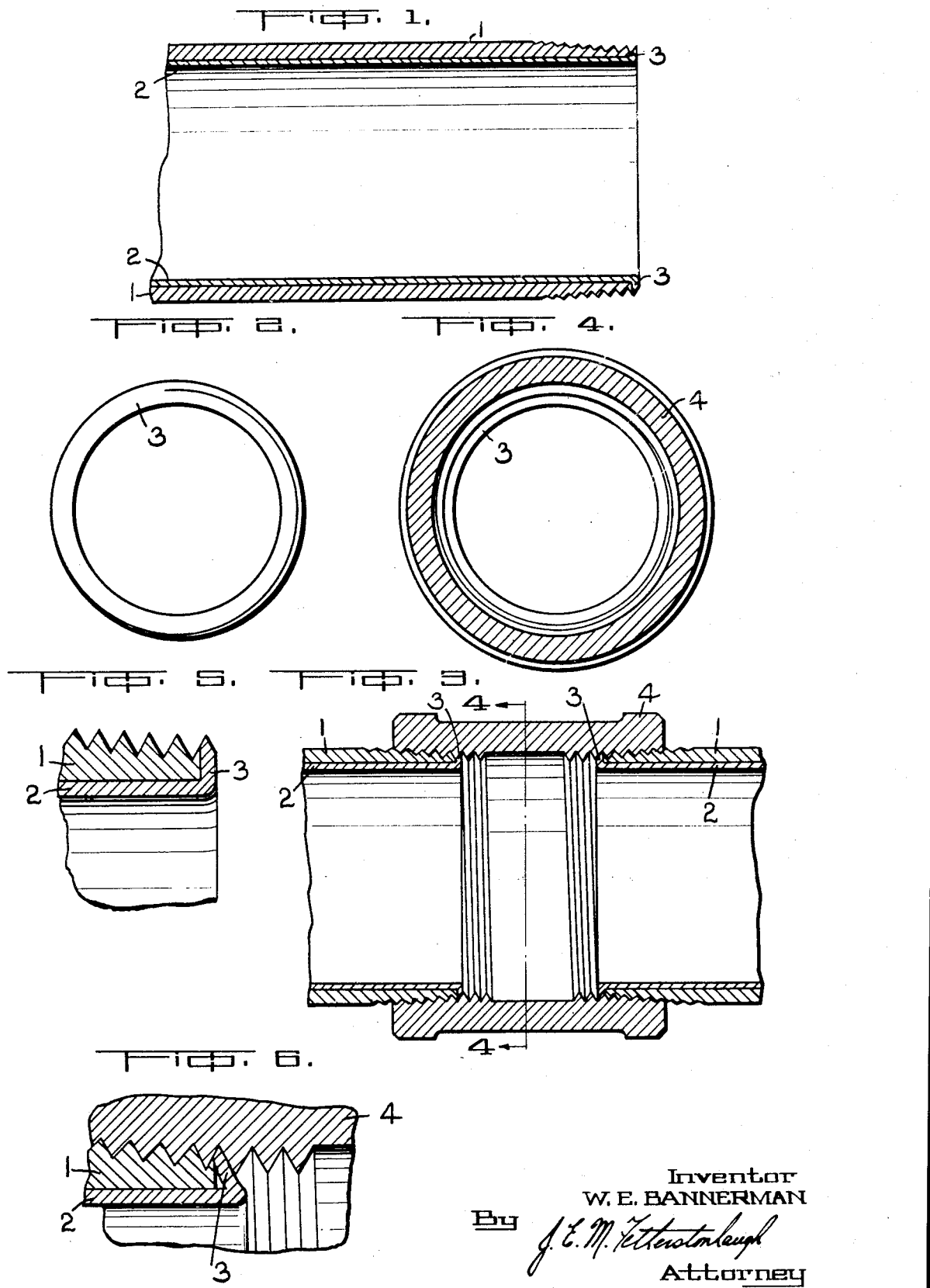

2,086,151

UNITED STATES PATENT OFFICE 2,086,151

JOINT FOR LINED PIPE

William Ewart Bannerman, Toronto, Ontario, Canada

Application August 23, 1935, Serial No. 37,552
In Canada March 28, 1935

1 Claim. (Cl. 285—148)

My invention relates to improvements in joints for lined pipes, particularly those pipes composed of an outer shell of steel or iron having a liner of copper, brass or other metal insusceptible to corrosion or oxidation due to the action of water or other fluid thereon passing therethrough, and the object of the invention is to devise an improved joint in which only the non-corrodible metal will throughout be presented to the action of the water or other fluid.

A further object is to construct a joint which will obviate the use of washers or other special devices to effect the seal between the pipe and the fitting comprising the joint and to prevent the water or other fluid coming in contact with the corrodible outer shell of the pipe.

A still further object is to devise a joint constituted by the pipe and fitting in which the seal therebetween will be formed at the junction of the threaded part of the liner with the threaded interior of the fitting permitting the expansion of the liner which has a different coefficient of expansion to that of the outer shell.

Yet another object is to construct a joint in which the pipe end forming part thereof can be readily fabricated in the mill as well as on the job where such pipes must be cut to required lengths.

Hitherto where lined pipes have been used, as above indicated, special fittings have been required to effect the joints between the pipes. Such fittings are expensive and their use is troublesome to plumbers, steamfitters and others installing water and heating systems. The purpose of the present invention is, as above stated, to so construct the pipe ends that only fittings of a particular type need be used to form the joint and, moreover, such joint may be made with the usual tools with which the plumber or steamfitter is familiar. Furthermore in the case where the pipe end is formed on the job as is required where lined pipes must be cut to fit, to form such end, the plumber of steamfitter need also only employ tools with which he is familiar.

My invention consists, in its preferred embodiment, of the construction and arrangement of joint all as hereinafter more particularly described and illustrated in the accompanying drawing in which:—

Fig. 1 represents, in longitudinal section, a portion of a lined pipe having its end formed according to my invention.

Fig. 2 is an end view of the lined pipe illustrated in Fig. 1.

Fig. 3 is a longitudinal section through a typical joint showing the pipe ends constructed according to my invention threaded into a standard fitting, for instance as illustrated a coupling, formed of non-corrodible metal.

Fig. 4 is a cross-section taken through the line 4—4 (Fig. 3).

Fig. 5 is an enlarged fragmentary longitudinal section, and

Fig. 6 is a similar section to Fig. 5 only showing the pipe end screwed into the fitting and the flange of the liner distorted as would occur under the action of hot water or other heated fluid due to the differences in coefficients of expansions of the liner and the outer shell.

Like characters of reference indicate corresponding parts in the different views.

Lined or composite pipes, composed of an outer shell of steel or iron with a liner of copper, brass or like metal insusceptible to corrosion or rusting by the action of water are well known and such a pipe is illustrated in the drawing in which 1 represents the outer shell of steel or iron and 2 the liner of substantially non-corrodible material, such as copper, which on account of its ductility is the metal usually employed.

According to my invention, I extend the end of the liner 2 beyond the end of the shell 1 and by means of a forming tool flange such extending end of the liner outwardly to constitute the flange 3 which is pressed against the end of the shell completely covering it.

By means of a pipe die I then cut a thread on the exterior of the shell 1 and in the peripheral edge of the flange 3. Such thread should preferably be an orthodox tapered thread. The pipe die serves to press the flange further against the metal of the shell 1 so that a substantially homogeneous union between the two metals is achieved. Thus the exterior thread on the pipe end is composed for a thread or so from its free extremity of copper or whatever non-corrodible metal the liner is constituted and the remainder of the thread is steel or iron i. e. the material of the shell. As is the usual practice in threading pipe ends, this thread may be tapered.

The fitting 4, which is of non-corrodible material, is shoulderless interiorly in the sense that it has no shoulders adapted to constitute abutments for the pipe ends, and may be of any usual form such as a coupling, union, T or the like. As illustrated, it comprises a coupling, the ends of which are internally threaded in the orthodox fashion.

In forming the joint, the pipe ends constructed according to my invention are threaded into the fitting in the ordinary way and screwed up until a water tight joint is effected. The usual sealing compound or "dope" may be employed, if desired. When the joint is made, the entire inner surface of each pipe exposed to the action of the water is of non-corrodible metal and, as above described, such non-corrodible metal extends back a thread or so from the free end of the pipe thread. Thus there is no possibility of the water corroding the joint and either weakening it or enabling the products of such corrosion to reduce the cross-sectional area of the pipe at the joint which will restrict the flow of water therethrough.

In forming the above joint as hereinbefore described it will be observed that the two pipe ends are disposed in spaced relation to each other in the fitting and, therefore, the seal is not effected by the abutting relation of such pipe ends or by a washer or gasket being disposed therebetween. Such seal in my invention is constituted by the peripheral threaded edge of the liner coacting with the internal threads of the fitting. Furthermore, the flange of the liner is only anchored at the peripheral edge of the liner by the latter being threaded in the fitting and, therefore, the remaining portion of the liner flange is free to separate from the end of the outer shell when the liner expands under the influence of hot water passing therethrough as is illustrated in Fig. 6 of the drawing.

By the use of my joint, the employment of special fittings hitherto used for joining lined pipes is entirely avoided with a consequent reduction in cost in installing pipe systems incorporating lined pipes and consequently the use of such lined pipes can be more materially extended on this account as well as due to the fact that the ease of assembly is, by my invention, comparable to that of ordinary steel or iron pipes hitherto almost universally employed in water and heating systems.

What I claim as my invention is:

In means for joining pipes of corrodible material having a non-corrodible lining for protecting the corrodible part of the pipe from the contents thereof, a pipe end having a portion of said lining of sufficient length to entirely cover the end of the corrodible portion of the pipe swaged thereover and said swaged-over portion being of sufficient thickness to receive and sustain substantially a turn of the thread when the pipe is threaded, whereby when the pipe is assembled with a conventional non-corrodible pipe fitting a complete barrier of non-corrodible material is interposed between the corrodible portion of the pipe and the contents thereof.

WILLIAM EWART BANNERMAN.